United States Patent
Kim et al.

(10) Patent No.: US 12,009,642 B2
(45) Date of Patent: Jun. 11, 2024

(54) POWER DEVICE FOR CONTINUOUSLY DETECTING ENTRY AND EXIT POSITIONS

(71) Applicant: LS ELECTRIC CO., LTD., Anyang-si (KR)

(72) Inventors: Young Kim, Anyang-si (KR); Min-Kyu Seo, Anyang-si (KR)

(73) Assignee: LS ELECTRIC CO., LTD., Anyang-si (KR)

( * ) Notice: Subject to any disclaimer, the term of this patent is extended or adjusted under 35 U.S.C. 154(b) by 136 days.

(21) Appl. No.: 17/916,715

(22) PCT Filed: Mar. 29, 2021

(86) PCT No.: PCT/KR2021/003874
§ 371 (c)(1),
(2) Date: Oct. 3, 2022

(87) PCT Pub. No.: WO2021/201538
PCT Pub. Date: Oct. 7, 2021

(65) Prior Publication Data
US 2023/0144848 A1    May 11, 2023

(30) Foreign Application Priority Data
Apr. 3, 2020   (KR) .................. 10-2020-0041146

(51) Int. Cl.
*H02B 1/36*       (2006.01)
*H02B 11/133*     (2006.01)
*H02B 11/167*     (2006.01)

(52) U.S. Cl.
CPC ............. *H02B 1/36* (2013.01); *H02B 11/133* (2013.01); *H02B 11/167* (2013.01)

(58) Field of Classification Search
CPC ........ H02B 1/36; H02B 11/133; H02B 11/167
See application file for complete search history.

(56) References Cited

U.S. PATENT DOCUMENTS 7,952,065 B2 *   5/2011   Hama .................. G01D 5/34
                                                   250/231.13
8,304,672 B2 *  11/2012   Lee .................... H02B 11/127
                                                   200/50.25
(Continued)

FOREIGN PATENT DOCUMENTS

CN      202816778 U      3/2013
CN      107275970 A     10/2017
(Continued)

OTHER PUBLICATIONS

Extended European Search Report for related European Application No. 21780263.6; action dated Aug. 9, 2023; (10 pages).
(Continued)

*Primary Examiner* — Robert J Hoffberg
(74) *Attorney, Agent, or Firm* — K&L Gates LLP (57) ABSTRACT

A power device for continuously detecting entry and exit positions. The power device comprises: a cradle having a cradle terminal formed therein; a breaker main body mechanically and electrically connected to or separated from the cradle terminal; and a girder and a truck which are transfer devices for moving the breaker main body to a connection or separation position, wherein the power device comprises: a position detection area portion formed on a side surface of the breaker main body; and a sensor module provided with a non-contact sensor which faces the position detection area portion and detects the position of the breaker main body by sensing a moving position of the position sensing area portion, the sensor module being fixedly coupled to the inner surface of the cradle.

6 Claims, 8 Drawing Sheets

(56) References Cited

U.S. PATENT DOCUMENTS

| | | | | |
|---|---|---|---|---|
| 9,218,923 B2* | 12/2015 | Johansson | ............ | H01H 73/12 |
| 9,293,111 B2* | 3/2016 | Kwack | ............ | G09G 5/005 |
| 10,320,161 B2* | 6/2019 | Kini | ............ | H02B 11/12 |
| 11,821,949 B2* | 11/2023 | Choi | ............ | G01R 31/3274 |
| 11,875,956 B2* | 1/2024 | Seo | ............ | H01H 33/6661 |
| 2018/0145487 A1 | 5/2018 | Kini et al. | | |
| 2022/0206070 A1* | 6/2022 | Lee | ............ | G01R 31/3274 |
| 2022/0317188 A1* | 10/2022 | Seo | ............ | H01H 33/664 |
| 2023/0154696 A1* | 5/2023 | Kim | ............ | H01H 9/02 |
| | | | | 200/237 |
| 2023/0154711 A1* | 5/2023 | Lee | ............ | H01H 71/522 |
| | | | | 200/312 |
| 2023/0154712 A1* | 5/2023 | Kim | ............ | H02B 11/10 |
| | | | | 335/17 |

FOREIGN PATENT DOCUMENTS

| | | | |
|---|---|---|---|
| CN | 109861125 A | | 6/2019 |
| JP | 2014033590 A | | 2/2014 |
| KR | 19990055497 A | | 7/1999 |
| KR | 200340100 Y1 | | 1/2004 |
| KR | 20110037793 A | | 4/2011 |
| KR | 20130000281 A | | 1/2013 |
| WO | 2017011536 A1 | | 1/2017 |

OTHER PUBLICATIONS

Office Action for related Japanese Application No. 2022-558207; action dated Nov. 28, 2023; (7 pages).
International Search Report for related International Application No. PCT/KR2021/003874; action dated Oct. 7, 2021; (5 pages).
Written Opinion for related International Application No. PCT/KR2021/003874; action dated Oct. 7, 2021; (3 pages).

* cited by examiner

POWER DEVICE FOR CONTINUOUSLY DETECTING ENTRY AND EXIT POSITIONS

CROSS-REFERENCE TO RELATED APPLICATION

The present application is a National Stage of International Application No. PCT/KR2021/003874 filed on Mar. 29, 2021, which claims priority to and the benefit of Korean Utility Model Application No. 10-2020-0041146, filed on Apr. 3, 2020, the disclosure of which is incorporated herein by reference in its entirety.

FIELD

The present disclosure relates to a power device for continuously detecting extended and retracted positions of a circuit breaker body, and more specifically to a power device for continuously detecting accurate extended and retracted positions of a circuit breaker body moving in a cradle.

BACKGROUND

In general, a power device refers to any device that may receive and transmit power and convert the power.

Figure 1:
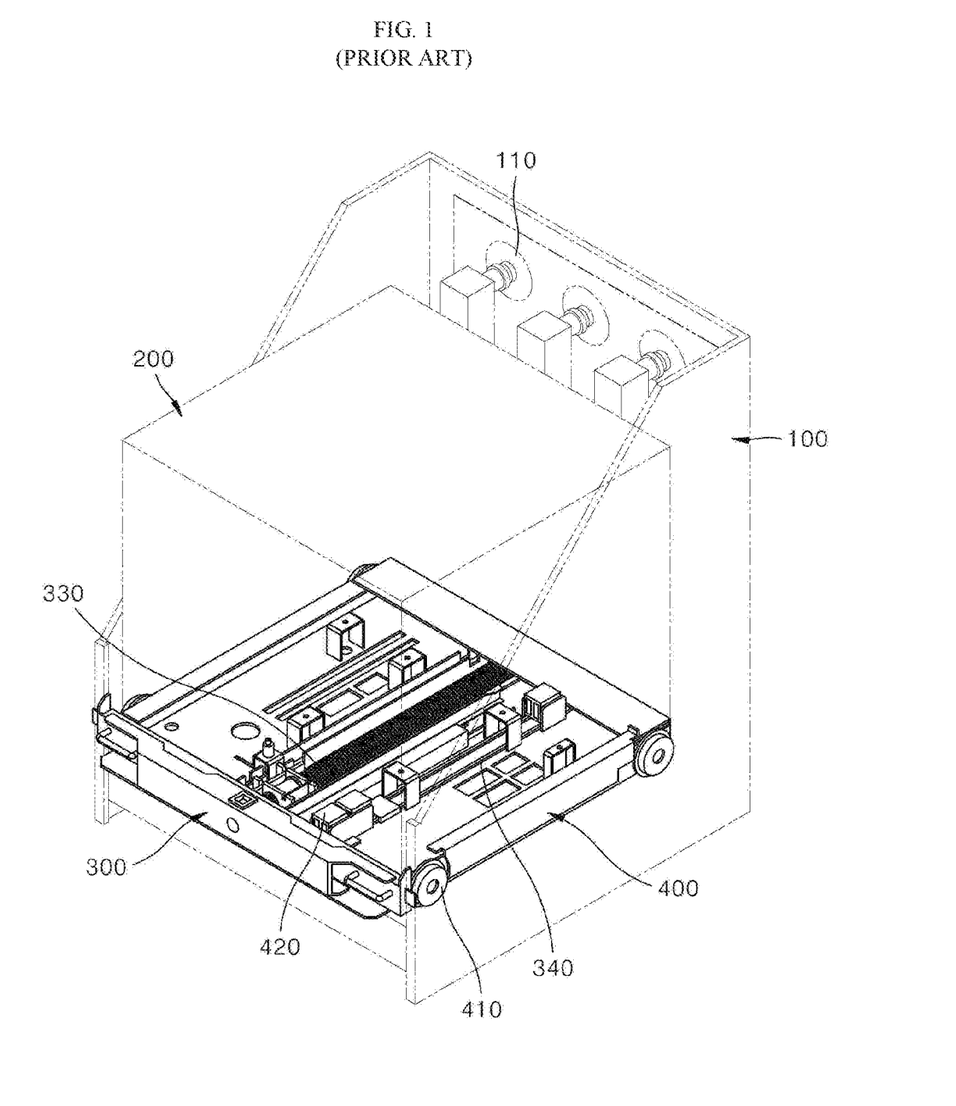
FIG. 1 is a perspective view showing a conventional power device.

FIG. 1 is a perspective view showing a conventional power device.

Referring to FIG. 1, the conventional power device includes a cradle terminal 110 connected to a power line connected to an external power source or a load. Further, the power device includes a cradle 100 fixed to a switchboard, a circuit breaker body 200 mechanically and electrically connected to or disconnected from the terminal 110 of the cradle 100, and a girder 300 and a truck 400 to bring the circuit breaker body 200 to a contact or disconnection position in which the body is mechanically and electrically connected to or disconnected from the terminal 110 of the cradle 100.

In this regard, the contact position means a position in which the circuit breaker body 200 approaches the cradle terminal 110 at the maximum level and electrically contacts the terminal 110.

Further, the disconnection position means a position in which the circuit breaker body 200 is spaced from the cradle terminal 110 by the maximum spacing and thus is electrically disconnected from the cradle terminal 110.

Further, a test position means a position corresponding to a process in which the body is being displaced from the contact position to the disconnection position or from the disconnection position to the contact position.

Figure 2:
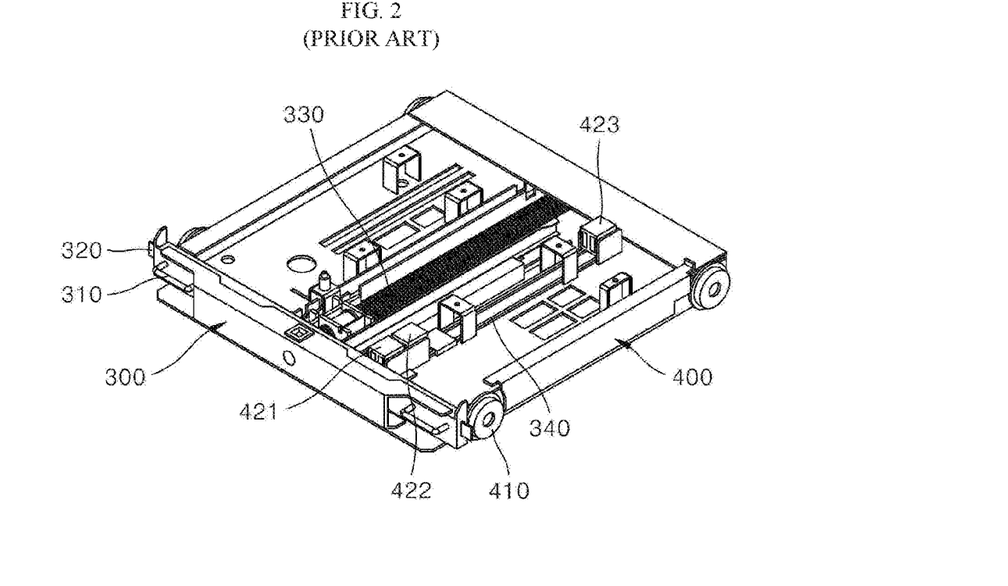
FIG. 2 is a perspective view showing a girder and a truck according to a disconnection position in the conventional power device.
Figure 3:
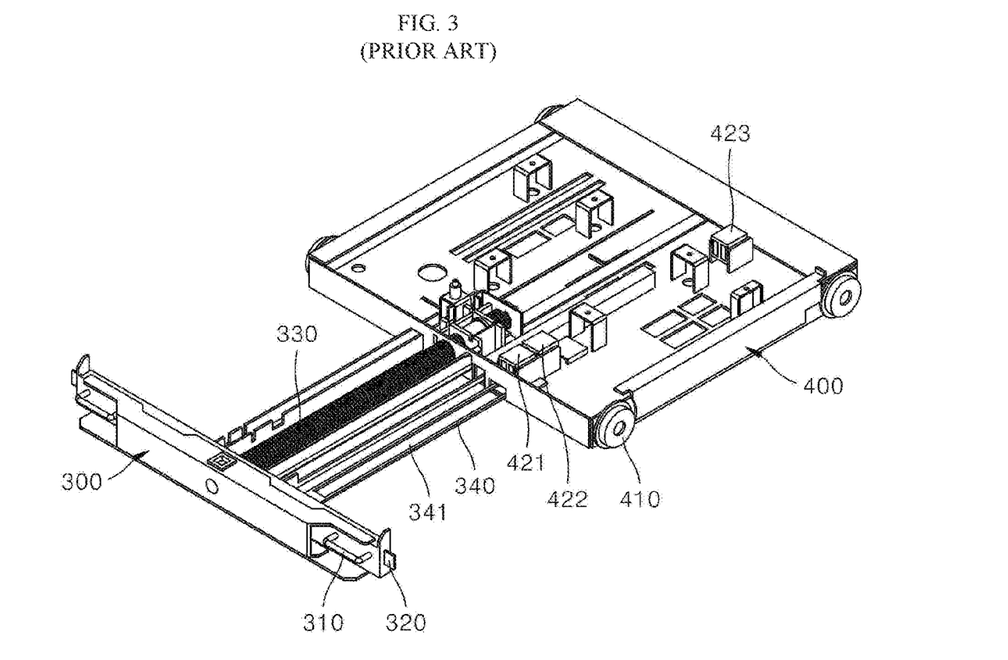
FIG. 3 is a perspective view showing the girder and the truck according to a contact position in the conventional power device.

Further, FIG. 2 and FIG. 3 are perspective views showing the girder 300 and the truck 400 according to the disconnection position and the contact position in FIG. 1, respectively.

Figure 4:
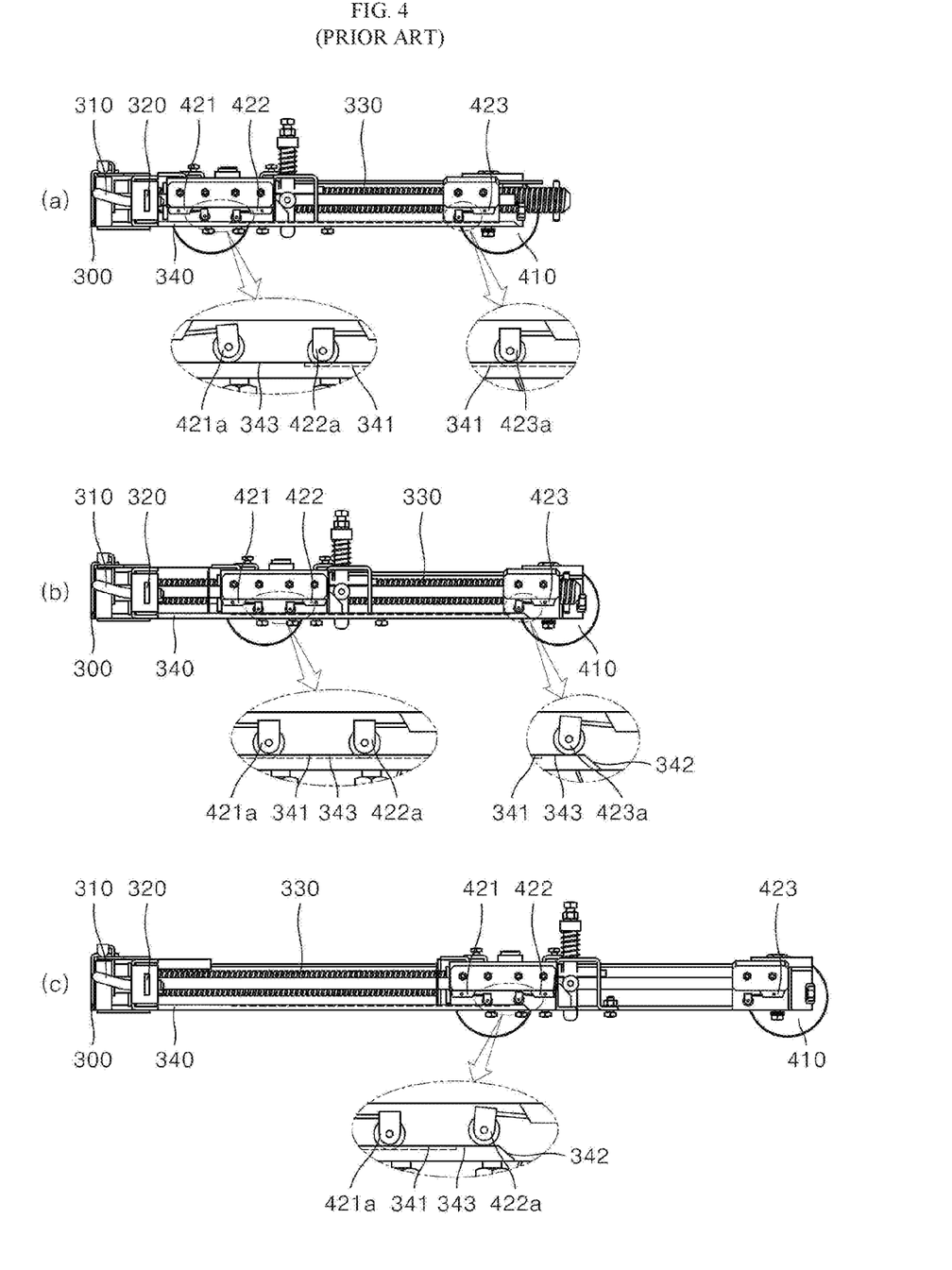
FIG. 4 is a cross-sectional view showing the girder and the truck according to each of the disconnection, test, and contact positions in the conventional power device.

Further, FIG. 4 shows cross-sectional views of the girder 300 and the truck 400 according to disconnection, test, and contact positions in the conventional power device, respectively.

Referring to FIGS. 2 to 4, in the conventional power device, the girder 300 includes a pair of handle bars 310 formed on a front face thereof, support ribs 320 respectively formed at both opposing sides thereof, and a spindle 330 having one end rotatably coupled to a center of the front face thereof, and a switch actuation bar 340 formed on one side of the spindle 330.

Further, the truck 400 includes a plurality of wheels 410 formed at each of both opposing sides thereof and a plurality of micro switches 420 actuated by the switch actuation bar 340. As the spindle 330 rotates, a spacing between the truck 400 and the girder 300 is adjusted as shown in FIGS. 2 and 3.

That is, as the spindle 330 rotates clockwise or counterclockwise, the spacing between the truck 400 and the cradle terminal 110 is adjusted.

Further, the switch actuation bar 340 includes an elongate groove 341 formed to correspond to a movement range of the truck 400, a rear end inclined portion 342 formed at one end of the groove 341, and a top planar portion 343 constituting a top face except for the groove 341 and the rear end inclined portion 342.

Further, the micro switch 420 includes first to third micro switches 421, 422, and 423.

In more detail, the first micro switch 421 includes a first contact lever 421a formed on a bottom thereof so as to contact the switch actuation bar 340, and is closest to the girder 300.

Further, the second micro switch 422 includes a second contact lever 422a formed on a bottom thereof so as to contact the switch actuation bar 340, and is adjacent to a rear end of the first micro switch 421.

Further, the third micro switch 423 includes a third contact lever 423a formed on a bottom thereof so as to contact the switch actuation bar 340, and is adjacent to a rear end of the truck 400.

A method for detecting a relative position between the terminal 110 of the cradle 100 and the circuit breaker body 200 using the truck 300 in this conventional power device is as follows.

Referring to (a) of FIG. 4, the spacing between the truck 400 and the girder 300 becomes minimum at the disconnection position of the conventional power device.

Accordingly, the distance between the circuit breaker body 200 and the cradle terminal 110 becomes maximum.

Further, the first contact lever 421a is in contact with the top planar portion 343, while each of the second contact lever 422a and the third contact lever 423a is in contact with the groove 341.

Further, referring to (b) of FIG. 4, at the test position of the conventional power device, as the spacing between the girder 300 and the truck 400 increases, each of the first contact lever 421a and the second contact lever 422a comes into contact with the groove 341.

Further, the third contact lever 423a passes by the rear end inclined portion 342 and then comes into contact with the top planar portion 343.

Further, referring to (c) of FIG. 4, at the contact position of the conventional power device, the spacing between the truck 400 and the girder 300 becomes maximum.

Accordingly, the circuit breaker body 200 is in contact with and thus electrically connected to the cradle terminal 110.

At this time, the first contact lever 421a comes into contact with the groove 341, and the second contact lever 422a passes by the rear end inclined portion 342 and comes into contact with the top planar portion 343.

As described above, in the prior art, the spacing the truck 400 and the girder 300 is adjusted in a state in which the switch actuation bar 340 is coupled to the girder 300. Thus, the position of the circuit breaker body 200 is detected based on whether the plurality of micro switches 420 fixedly installed on the truck 400 are in contact with the switch actuation bar 340.

Accordingly, in the prior art, the position of the circuit breaker body 200 may be detected at each of the disconnection, test, and contact positions of the power device. However, a varying distance between the circuit breaker body 200 and the cradle terminal 110 cannot be detected.

That is, according to the prior art, there is a problem that the position of the circuit breaker body 200 cannot be continuously detected.

Further, in the prior art, as physical contact between the micro switch 420 and the switch actuation bar 340 is continuously made in order to detect the position of the circuit breaker body 200, deformation to or damage to a coupling portion between the micro switch 420 and the truck 400 may frequently occur.

Accordingly, in the related art, the position of the circuit breaker body 200 cannot be accurately detected due to frequent occurrence of the deformation of or the damage to the coupling portion between the micro switch 420 and the truck 400.

SUMMARY

A purpose of the present disclosure is to provide a power device for continuously detecting extended and retracted positions of a circuit breaker body which is capable of linearly detecting a position of the circuit breaker body over an entirety of a movement range.

Further, a purpose of the present disclosure is to provide a power device for continuously detecting extended and retracted positions of a circuit breaker body in which physical contact between components in order to detect the position of the circuit breaker body is minimized.

Purposes according to the present disclosure are not limited to the above-mentioned purpose. Other purposes and advantages according to the present disclosure that are not mentioned may be understood based on following descriptions, and may be more clearly understood based on embodiments according to the present disclosure.

Further, it will be easily understood that the purposes and advantages according to the present disclosure may be realized using means shown in the claims and combinations thereof.

In order to achieve the purpose, the present disclosure provides a power device for continuously detecting extended and retracted positions of a circuit breaker body, wherein the power device for continuously detecting each of extended and retracted positions of the circuit breaker body includes a cradle having a cradle terminal; a circuit breaker body mechanically and electrically connected to or disconnected from the cradle terminal; and a girder and a truck as transporting means for moving the circuit breaker body to a contact or disconnection position with or from the cradle terminal, wherein the power device is capable of linearly detecting a position of the circuit breaker body over an entirety of a movement range.

More specifically, the power device includes: a position detected area portion formed on at least one of both opposing side faces of the circuit breaker body; and a sensor module fixed to at least one of both opposing inner side faces of the cradle, wherein the sensor module includes at least one sensor facing the position detected area portion so to detect a displaced position of the position detected area portion and thus to detect a position of the circuit breaker body, based on the detected displaced position.

Further, the position detected area portion may include at least one of: a position sticker having a shade varying in a movement direction of the truck; a plurality of position protrusions, wherein at least one of a number, a shape, or a position thereof varies in the movement direction of the truck; or a position inclined portion having one face inclined downwardly or upwardly in the truck movement direction.

Further, the sensor may include at least one of a non-contact type sensor or a contact type sensor.

More preferably, the contact type sensor may be embodied as a roller-type sensor having a roller rotating while being in contact with a side face of the circuit breaker body.

Further, the sensor may include a contact type sensor configured to contact the position inclined portion and to detect a varying height of the position inclined portion and to detect the position of the circuit breaker body based on the detected varying height.

Further, the device may further include a cleaner disposed in front or rear of the sensor module so as to remove dust or foreign substance deposited on the position detected area portion.

The power device for continuously detecting extended and retracted positions according to the present disclosure may linearly detect the position of the circuit breaker body over an entirety of a movement range, thereby achieving an advantage of being able to identify an accurate position of the circuit breaker body in real time.

Further, in the power device for continuously detecting extended and retracted positions according to the present disclosure, physical contact between components in order to detect a position of the circuit breaker body may be minimized to improve durability of the power device.

DETAILED DESCRIPTION

The above objects, features and advantages will be described in detail later with reference to the accompanying drawings. Accordingly, a person with ordinary knowledge in the technical field to which the present disclosure belongs will be able to easily implement the technical idea of the present disclosure. In describing the present disclosure, when it is determined that a detailed description of a known component related to the present disclosure may unnecessarily obscure gist the present disclosure, the detailed description is omitted. Hereinafter, a preferred embodiment according to the present disclosure will be described in detail with reference to the accompanying drawings. In the drawings, the same reference numerals are used to indicate the same or similar elements.

In addition, it will also be understood that when a first element or layer is referred to as being present "on" or "beneath" a second element or layer, the first element may be disposed directly on or beneath the second element or may be disposed indirectly on or beneath the second element with a third element or layer being disposed between the first and second elements or layers.

It will be understood that when an element or layer is referred to as being "connected to", or "coupled to" another element or layer, it may be directly on, connected to, or coupled to the other element or layer, or one or more intervening elements or layers may be present.

As used herein, the singular forms "a" and "an" are intended to include the plural forms as well, unless the context clearly indicates otherwise.

It will be further understood that the terms "comprises", "comprising", "includes", and "including" when used in this specification, specify the presence of the stated features, integers, operations, elements, and/or components, but do not preclude the presence or addition of one or more other features, integers, operations, elements, components, and/or portions thereof.

As used herein, the term "A and/or B" includes any and all combinations of one or more of A and B unless otherwise specified. When referring to "C to D", this means C inclusive to D inclusive unless otherwise specified.

Hereinafter, a power device for continuously detecting extended and retracted positions of a circuit breaker body according to some embodiments of the present disclosure will be described.

The same reference numerals are allocated to the same components of the power device for continuously detecting the extended and retracted positions of the circuit breaker body according to the present disclosure as those of the conventional power device.

Figure 5:
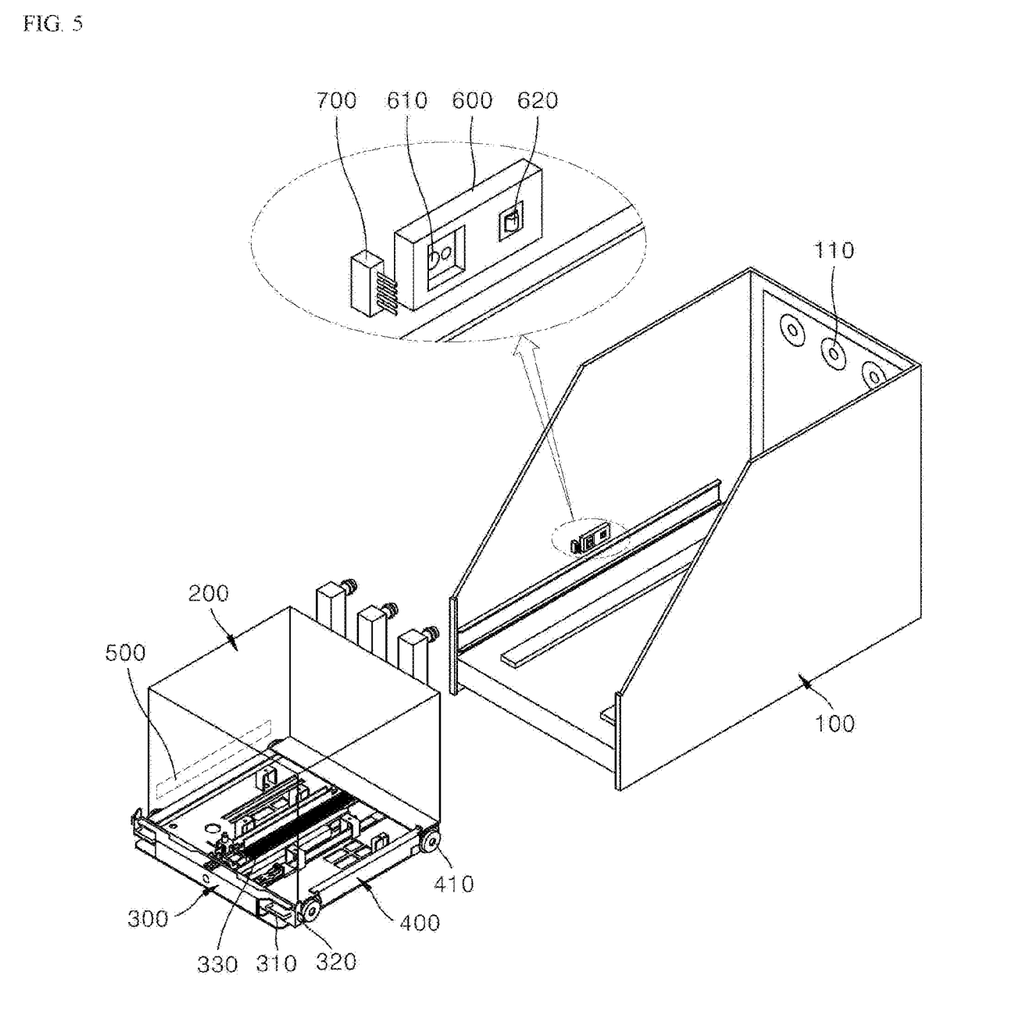
FIG. 5 is a perspective view showing a state before a circuit breaker body is mounted to a cradle in a power device for continuously detecting extended and retracted positions according to an embodiment of the present disclosure.

FIG. 5 is a perspective view showing a state before a circuit breaker body is mounted to a cradle in a power device for continuously detecting extended and retracted positions according to an embodiment of the present disclosure.

Figure 6:
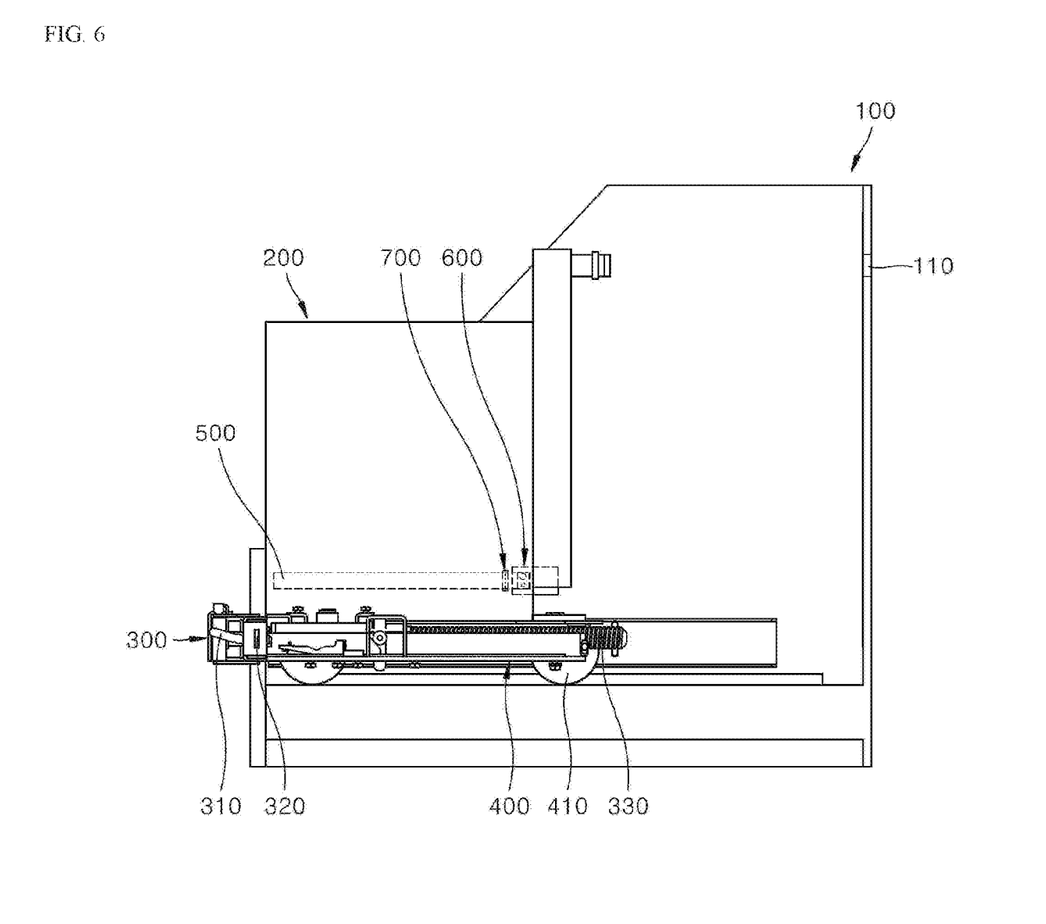
FIG. 6 is a side cross-sectional view at a disconnection position in a power device for continuously detecting extended and retracted positions according to an embodiment of the present disclosure.
Figure 7:
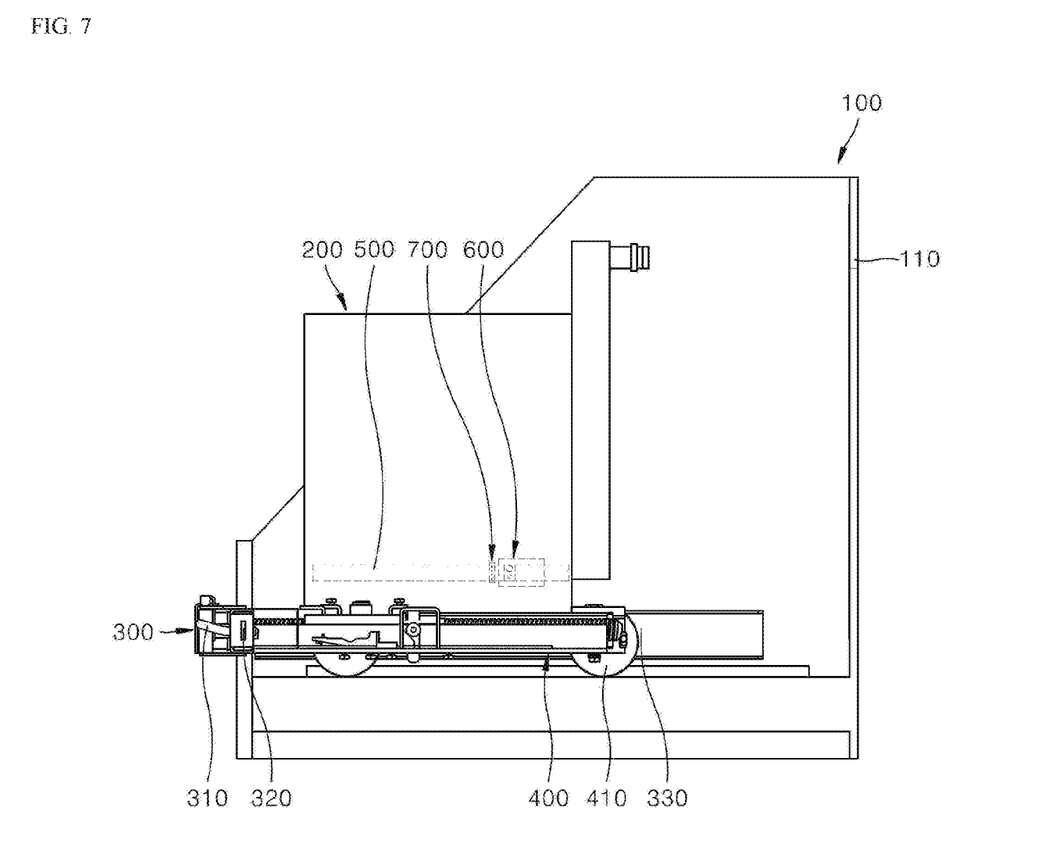
FIG. 7 is a side cross-sectional view at an operation position in a power device for continuously detecting extended and retracted positions according to an embodiment of the present disclosure.
Figure 8:
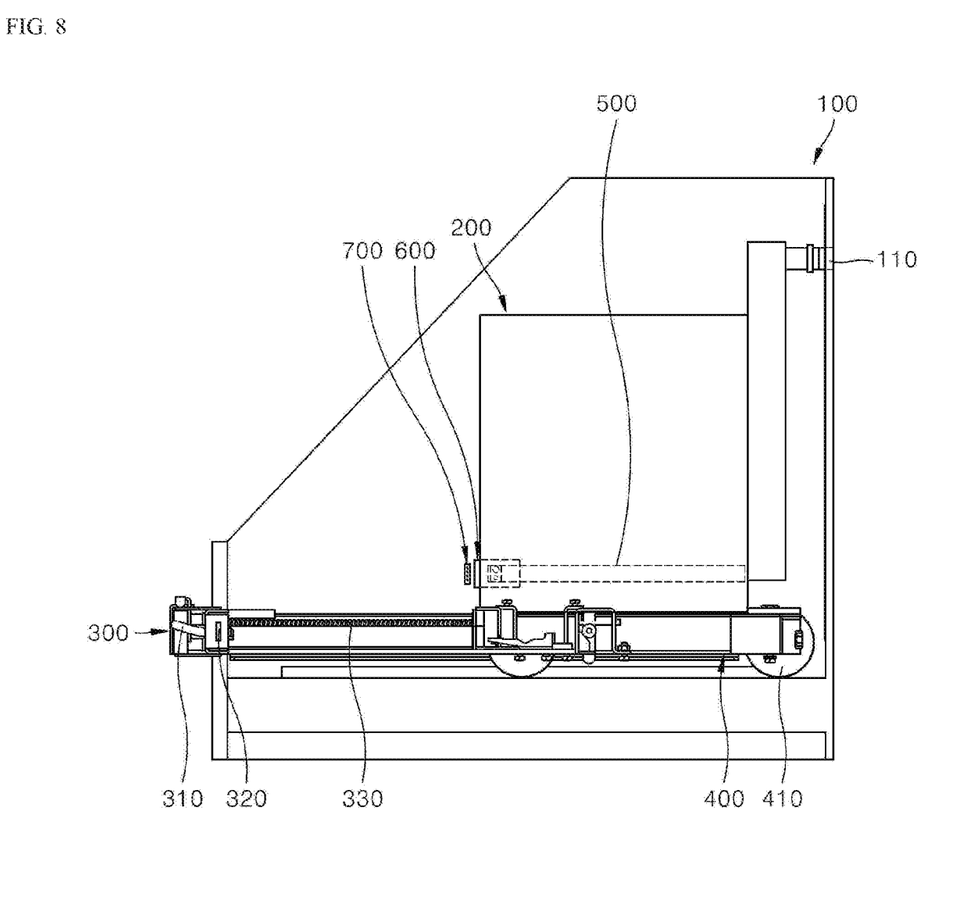
FIG. 8 is a side cross-sectional view at a contact position in a power device for continuously detecting extended and retracted positions according to an embodiment of the present disclosure.

Further, FIG. 6 to FIG. 8 are side cross-sectional views respectively at disconnection, operation, and contact positions in a power device for continuously detecting extended and retracted positions according to an embodiment of the present disclosure.

Referring to FIG. 5 to FIG. 8, the power device for continuously detecting the extended and retracted positions of the circuit breaker body according to the present disclosure includes the cradle 100 having the cradle terminal 110 connected to a power line connected to an external power source or a load, and fixed to a switchboard, the circuit breaker body 200 that is mechanically and electrically connected to or disconnected from the terminal 110 of the cradle 100, and the girder 300 and the truck 400 as a transport device that moves the circuit breaker body 200 to a disconnection or contact position.

More preferably, the circuit breaker body 200 is fixedly mounted to the truck 400. Accordingly, as the truck 400 moves, a spacing between the circuit breaker body 200 and the cradle terminal 110 is adjusted.

In accordance with the present disclosure, the circuit breaker includes the circuit breaker body, 200 the girder 300 and the truck 400.

Further, the disconnection position means a position in which the circuit breaker body 200 is spaced from the cradle terminal 110 by the maximum spacing and thus is electrically disconnected from the cradle terminal 110.

That is, the disconnection position means a state in which the spacing between the girder 300 and the truck 400 is minimized as shown in FIG. 6.

Further, the contact position means a position in which the circuit breaker body 200 approaches the cradle terminal 110 at the maximum level and electrically contacts the terminal 110.

That is, the contact position means a state in which the spacing between the girder 300 and the truck 400 is maximized as shown in FIG. 8.

Further, the operation position means a state in which the spacing between the girder 300 and the truck 400 is adjusted in a process in which the body is being displaced from the contact position to the disconnection position or from the disconnection position to the contact position, as shown in FIG. 7.

The girder 300 includes a pair of handle bars 310 formed on a front face thereof, support ribs 320 respectively formed at both opposing sides thereof, and a spindle 330 having one end rotatably coupled to a center of the front face thereof.

More specifically, the handle bar 310 may refer to a part gripped by an operator when the girder 300 and the truck 400 are mounted to or disconnected from the cradle 100 and be formed in various shapes.

Further, the girder 300 is fixed to the cradle 100 while each of the support ribs 320 is inserted into and fixed to each of both opposing sides of the cradle 100.

Further, the spindle 330 is coupled to the truck 400 such that one end of the spindle is coupled to a central portion of the girder 300 and the other end thereof faces the cradle terminal 110.

In one embodiment of the present disclosure, when the spindle 300 rotates clockwise or counterclockwise, the spacing between the girder 300 and the truck 400 is adjusted.

Further, the rotation of the spindle 330 may be achieved by an operator inserting a handle to a hole formed in a front face of the girder and manually rotating the handle, or may be automatically achieved by a driving motor.

In one example, the power device for continuously detecting extended and retracted positions according to the present disclosure includes a position detected area portion 500 formed on a side face of the circuit breaker body 200, and a sensor module 600 fixed to an inner side face of the cradle 100, wherein the sensor module includes a non-contact type sensor 610 facing the position detected area portion 500 to detect a displaced position of the position detected area portion 500 and thus detect a position of the circuit breaker body 200 based on the detected displaced position.

More preferably, the position detected area portion 500 is positioned such that an end thereof adjacent to the cradle terminal 110 faces the sensor module 600 at the disconnection position, and an end thereof adjacent to the girder 300 faces the sensor module 600 at the contact position.

That is, the position detected area portion 500 is formed on a side face of the circuit breaker body 200 and has a length proportional to a movement distance of the truck 400.

Further, a pair of position detected area portions 500 may be respectively formed on left and right side faces of the circuit breaker body 200 so as to be symmetrical with each other.

Accordingly, a pair of sensor modules 600 may be respectively disposed on both opposing side faces of the cradle 100.

Figure 9:
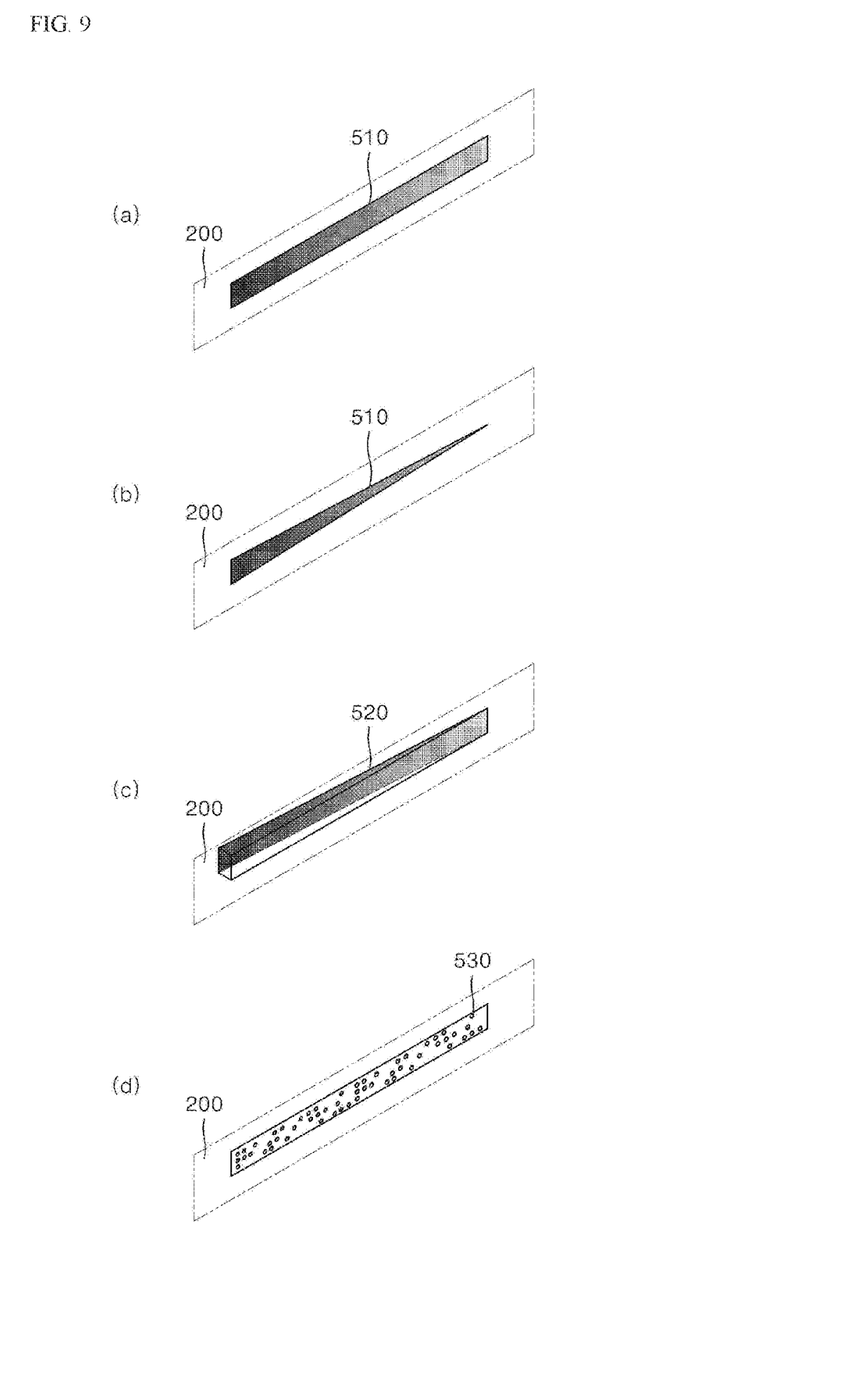
FIG. 9 is a side view illustrating a position detected area portion in a power device for continuously detecting extended and retracted positions according to an embodiment of the present disclosure.

Further, FIG. 9 is a perspective view showing a position detected area portion in a power device for continuously detecting extended and retracted positions according to an embodiment of the present disclosure.

Referring to FIG. 9, the position detected area portion 500 may extend along the movement range of the truck 400 as described above. More preferably, the position detected area portion 500 may be embodied as a position sticker 510 having a shade varying depending on a position, such as a gradation sticker.

Further, in order to prevent the position sticker 510 from protruding beyond a side face of the circuit breaker body 200, the position detected area portion 500 may have a groove defined therein having a depth equal to or larger than a thickness of the position sticker 510.

Accordingly, the position sticker 510 may be prevented from being redisplaced from the circuit breaker body 200.

Further, the position sticker 510 may be embodied as a gradation tape formed so that a portion thereof adjacent to the girder 300 is darker and a portion thereof adjacent to the cradle terminal 110 is brighter as shown in (a) of FIG. 9.

Alternatively, the position sticker 510 may be embodied as a gradation tape formed so that a portion thereof adjacent to the girder 300 is brighter and a portion thereof adjacent to the cradle terminal 110 is darker.

Alternatively, the position sticker 510 may be embodied as a gradation tape formed so that a portion thereof adjacent to the girder 300 is brighter and a portion thereof adjacent to the cradle terminal 110 is brighter, while a middle portion thereof is darker.

Alternatively, the position sticker 510 may be divided into at least two portions.

Alternatively, the position sticker 510 may be embodied as a gradation tape having an area size varying in a movement direction of the truck 400 as shown in (b) of FIG. 9.

Alternatively, the position detected area portion 500 may embodied as a position inclined portion 520 as shown in (c) of FIG. 9.

More specifically, as the position inclined portion 520 is displaced under movement of the truck 400, a distance between a top face of the position inclined portion 520 and the sensor module 600 may vary.

That is, the position inclined portion 520 may be formed such that a spacing between the cradle 100 and the position inclined portion 520 gradually decreases or increases as the position inclined portion 520 extends along a direction from one end to the other end thereof.

Further, the position inclined portion 520 may be formed so as to protrude beyond a side face of the circuit breaker body 200 or so as to be recessed downwardly of a side face of the circuit breaker body 200.

Further, the position sticker 510 may be attached to a top face of the position inclined portion 520.

In one example, the position detected area portion 500 may include a plurality of position protrusions 530 arranged and spaced from each other by a predefined spacing as shown in (d) of FIG. 9.

More preferably, the numbers or shapes of the position protrusions 530 may vary in the movement direction of the truck 400 so that the position of the circuit breaker body 200 may be detected by the sensor module 600.

Further, the position detected area portion 500 may include a combination of the position protrusions 530 and the position tape 510.

In one example, the non-contact type sensor 610 may be embodied as each of various sensors capable of detecting a shade or a distance of the position detected area portion 500 while being not in contact with the position detected area portion 500.

More preferably, the non-contact type sensor 610 may be embodied as an optical sensor and may be configured to detect a shade, a distance, a shape, etc. of a predefined area in the position detected area portion 510.

Accordingly, in the power device for continuously detecting extended and retracted positions according to the present disclosure, the non-contact type sensor 610 may sense the movement distance of the position detected area portion 500 even in the operation position corresponding to the process in which the circuit breaker body 200 moves from the contact position to the disconnection position, or moves from the disconnection position to the contact position. Thus, the position of the circuit breaker body 200 may be linearly detected.

Further, when the non-contact type sensor 610 is embodied as the optical sensor, it is preferable that the non-contact type sensor 610 is positioned into a recessed space defined in the sensor module 600 in order to minimize a detection error due to a shade caused by each of other components.

Accordingly, the power device for continuously detecting extended and retracted positions according to the present disclosure may linearly detect the position of the circuit breaker body 200 throughout the entire movement range thereof and thus may determine the exact position of the circuit breaker body 200 in real time.

Further, the sensor module 600 may include a contact type sensor 620.

In this case, the contact type sensor 620 may contact the position detected area portion 500 via an FPCB (Flexible Printed Circuit Board) or an elastic member.

More preferably, as shown in FIG. 5, the contact type sensor 620 may be embodied as a roller type sensor in which a roller may rotate under the movement of the circuit breaker body 200 while being in contact with a side face of the circuit breaker body 200.

That is, when the contact type sensor 620 is embodied as the roller type sensor, the sensor 620 may detect a rotation angle of the roller and detect the position of the circuit breaker body 200 based on the detected rotation angle.

Further, the contact type sensor 620 may contact the position inclined portion 520 and may detect a varying height of the position inclined portion 520 and thus detect the position of the circuit breaker body 200 based on the varying height.

Accordingly, in the power device for continuously detecting extended and retracted positions according to the present disclosure, both the non-contact type sensor 610 and the contact type sensor 620 may linearly detect the position of the circuit breaker body 200 throughout the entire movement range thereof simultaneously. Thus, the exact position of the circuit breaker body 200 may be determined in real time.

In one example, the cradle terminal 110 which the circuit breaker body 200 electrically and mechanically contacts may include terminals of three-phases (R, S, T). In this case, when contacts between the circuit breaker body 200 and these terminals 110 fail to occur concurrently, damage to the power device and power accident may occur.

Therefore, when the cradle terminal 110 which the circuit breaker body 200 electrically and mechanically contacts may include terminals of three-phases (R, S, T), the power device for continuously detecting extended and retracted positions according to the present disclosure may be configured such that the position detected area portion 500 is formed on each of both opposing side faces of the circuit breaker body 200 and accordingly, the sensor module 600 is formed on each of both opposing inner side faces of the cradle 100 so that contacts or disconnections between the circuit breaker body 200 and these terminals 110 occur concurrently.

Further, a monitoring unit (not shown) for generating an alarm when two positions of the circuit breaker body 200 respectively detected by the two sensor modules 600 do not coincide with each other may be further included in the power device.

Accordingly, in the power device for continuously detecting extended and retracted positions according to the present disclosure, the circuit breaker body 200 may contact or may be disconnected from the cradle terminal 110 to prevent device damage and power accidents.

Alternatively, in the power device for continuously detecting extended and retracted positions according to the present disclosure, the position detected area portion 500 may be formed on an inner side face of the cradle 100, while the sensor module 600 may be disposed on a side face of the circuit breaker body 200.

However, it is more preferable that the sensor module 600 is disposed on the inner side face of the cradle 100 as described above such that connection, control, and inspection of the sensor module 600 is facilitated.

In this regard, when the sensor provided in the sensor module 600 is embodied as an optical sensor including wireless communication means, the position detected area portion 500 may be formed on an inner side face of the cradle 100, and the sensor module 600 may be disposed on the side face of the breaker body 200, according to a design specification.

In one example, the power device for continuously detecting extended and retracted positions according to the present disclosure may further include a cleaner 700 configured to remove dust or foreign matter deposited on the position detected area portion 500. The cleaner 700 may be disposed in front or rear of the sensor module 600 as shown in FIG. 5.

In this regard, the cleaner 700 may be formed in a shape such as a brush or a roller and may remove dust or foreign substances deposited on the position detected area portion 500 under the movement of the circuit breaker body 200 while being in contact with the position detected area portion 500. This may minimize a detection error of the sensor module 600 due to the dust or foreign substances.

In one example, it is preferable that the cleaner 700 is installed in front of the sensor module 600.

When the cleaner 700 is adjacent to the cradle terminal 110, arc may occur such that the cleaner 700 may be damaged or an electrical problem may occur. Thus, the cleaner 700 may be spaced from the cradle terminal 110 by a maximum spacing.

Further, in the power device according to the present disclosure, the position detected area portion 500 may be formed on the cradle 100, and the sensor module 600 may be formed on the circuit breaker body 200.

The present disclosure has been described above with reference to the illustrated drawings. However, the present disclosure is not limited to the embodiments and drawings disclosed in the present specification. It is obvious that various modifications may be made by those skilled in the art within the scope of the technical idea of the present disclosure. In addition, although effects according to the configurations of the present disclosure are not explicitly described while describing the embodiments of the present disclosure, it is natural that the predictable effects from the configurations should also be appreciated.

What is claimed is:

1. A power device for continuously detecting each of extended and retracted positions of a circuit breaker body and for linearly detecting a position of the circuit breaker body, the power device comprising:
   a cradle having a cradle terminal;
   the circuit breaker body configured to mechanically and electrically connected to or disconnected from the cradle terminal;
   a girder and a truck as a transporting means for moving the circuit breaker body to a contact position with cradle terminal or disconnection position from the cradle terminal;
   a position detected area portion formed on at least one of both opposing side faces of the circuit breaker body; and
   a sensor module fixed to at least one of both opposing inner side faces of the cradle, wherein the sensor module includes at least one sensor facing the position detected area portion so to detect a displaced position of the position detected area portion and thus to detect a position of the circuit breaker body, based on the detected displaced position,
   wherein the position detection area portion has a length proportional to a moving distance of the truck to detect a linear position of the circuit breaker body over an entirety of a movement range of the circuit breaker body.

2. The power device of claim 1, wherein the position detected area portion includes at least one of:
   a position sticker having a shade varying in a movement direction of the truck;
   a plurality of position protrusions, wherein at least one of a number, a shape, or a position thereof varies in the movement direction of the truck; or
   a position inclined portion having one face inclined downwardly or upwardly in the movement direction of the truck.

3. The power device of claim 2, the position detected area portion includes the position inclined portion, wherein the at least one sensor includes a contact type sensor configured to contact the position inclined portion and to detect a varying height of the position inclined portion and to detect the position of the circuit breaker body based on the detected varying height.

4. The power device of claim 1, wherein the sensor includes at least one of a non-contact type sensor or a contact type sensor.

5. The power device of claim 4, wherein the sensor includes the contact type sensor, the contact type sensor is embodied as a roller-type sensor having a roller rotating while being in contact with a side face of the both opposing side faces of the circuit breaker body.

6. The power device of claim 1, wherein the device further comprises a cleaner disposed in front or rear of the sensor module configured to remove dust or foreign substance deposited on the position detected area portion.

* * * * *